United States Patent [19]

Eberly, Jr.

[11]  4,171,259
[45]  Oct. 16, 1979

[54] REFORMING WITH MULTIMETALLIC CATALYSTS

[75] Inventor: Paul E. Eberly, Jr., Baton Rouge, La.

[73] Assignee: Exxon Research & Engineering Co., Florham Park, N.J.

[21] Appl. No.: 950,806

[22] Filed: Oct. 12, 1978

Related U.S. Application Data

[60] Division of Ser. No. 862,114, Dec. 19, 1977, which is a continuation-in-part of Ser. No. 826,996, Aug. 23, 1977, abandoned.

[51] Int. Cl.$^2$ ............................................. C10G 35/08
[52] U.S. Cl. ................................... 208/139; 252/436; 252/439; 252/441
[58] Field of Search .................. 252/436, 439; 208/139

[56] References Cited

U.S. PATENT DOCUMENTS

| | | | |
|---|---|---|---|
| 2,851,399 | 9/1958 | Brennan et al. | 208/138 |
| 3,884,799 | 5/1975 | Mahoney et al. | 208/139 |

Primary Examiner—C. Davis
Attorney, Agent, or Firm—Llewellyn A. Proctor

[57]  ABSTRACT

A process for desensitizing a hypersensitive, high activity reforming catalyst for suppression of hydrogenolysis which is particularly acute during the early portion of the period that the catalyst is placed on stream, i.e., at the startup of a reactor. The catalyst is constituted of a composite which includes a Group VIII noble metal hydrogenation-dehydrogenation component, notably platinum, iridium or rhenium, and a sulfurous acid or sulfuric acid component. Hydrogenolysis is suppressed by incorporating within such reforming catalyst at the time of its preparation a sulfurous acid or sulfuric acid component. In another of its aspects the present invention embodies a reforming catalyst or catalyst composite comprising a refractory or inorganic oxide support material, particularly alumina, a Group VIII noble metal hydrogenation-dehydrogenation component, notably platinum, to which iridium or rhenium, and a sulfurous acid or sulfuric acid component have been added to promote the activity and selectivity of the catalysts, and said catalyst is prepared by a method wherein the sulfurous acid or sulfuric acid component is introduced into and deposited throughout said support. Suitably, the reforming catalyst, or composite also contains a halogen component, particularly chlorine and preferably the sulfurous acid or sulfuric acid component is introduced into the support, or catalyst, by impregnating with a liquid solution which contains one or both of these compounds.

1 Claim, No Drawings

REFORMING WITH MULTIMETALLIC CATALYSTS

This is a division of application Ser. No. 862,114, filed Dec. 19, 1977, which is a continuation-in-part of application Ser. No. 826,996, filed Aug. 23, 1977 and now abandoned.

Catalytic reforming, or hydroforming, is a well-known type of process employed in the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is cocurrently passed sequentially through a reheat furnace and then to the next reactor of the series. The vapor effluent from the last reactor of the series is a gas rich in hydrogen, which usually contains small amounts of normally gaseous hydrocarbons, and it is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group or Group VIII noble metals (ruthenium, osmium, rhodium, iridium, palladium and platinum) despite their expense have been recognized as having a combination of properties which make them particularly suitable for reforming operations, and hence certain of these species of catalysts have become widely used in commercial operations. Conventional reforming catalysts have thus long employed platinum composited with an inorganic oxide base, particularly alumina, and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Halogen, e.g., chlorine, is generally added to enhance the acid function required of the catalyst.

The principal reactions produced in reforming are: (1) dehydrogenation of naphthenes to produce the corresponding aromatic hydrocarbons, e.g., methylcyclohexane is dehydrogenated to form toluene, (2) isomerization on n-paraffins to form branched-chain paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling, constituents, e.g., the cracking of n-decane to produce $C_3$ and $C_7$ hydrocarbons. The net effect of these reactions is to increase the concentration of aromatics and isomers, with consequent octane improvement of naphthas boiling within the gasoline range.

Hydrogenolysis, a specific and severe form of hydrocracking which produces methane can also occur, and is particularly acute in reforming with the new "multimetallic" catalysts, e.g., platinum-rhenium, platinum-iridium, etc., particularly fresh or regenerated, reactivated catalysts of such type, which are particularly hypersensitive. Exotherms or heat fronts are produced which pass through a catalyst bed at startup, i.e., when new or freshly regenerated, reactivated catalyst is initially contacted with hydrocarbons at reforming temperatures. The temperature excursions or heat fronts are attributed to the hyperactivity of the catalyst which causes excessive hydrocracking of the hydrocarbons, or hydrogenolysis, sometimes referred to as "runaway hydrocracking." These temperature excursions or heat fronts are undesirable because the resultant temperature often results in damage to the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other type of reforming units, hydrogenolysis, or runaway hydrocracking greatly reduces the efficiency of the cyclic reforming process and simply cannot be tolerated. In fact, because of this problem some of the newer more highly active promoted platinum catalysts, i.e., multimetallic catalysts, are unsuitable in cyclic reforming processes.

It is conventional to presulfide a noble metal reforming catalyst prior to its use in reforming to suppress hydrogenolysis, or runaway hydrocracking, which can cause excessive methane formation, hot spots, temperature excursions, and the like. In presulfiding, it is conventional to charge catalyst into a reactor for contact with an admixture of hydrogen sulfide and an inert gas, e.g., nitrogen. Various difficulties, however, are associated with this practice. One difficulty of such technique, e.g., is that the sulfur is not deposited uniformly on the catalyst. The catalyst at the top of the reactor is heavily sulfided and only lightly sulfided near the bottom of the reactor. Only by sulfiding to the point of breakthrough can the catalyst at the bottom of the reactor be adequately sulfided, this causing the catalyst on the top of the reactor to be over-sulfided. Whereas this non-uniformity and over-sulfiding of the catalyst does not create particularly difficult problems in the use of unpromoted platinum catalysts, it produces particularly acute problems with the new multimetallic catalyst species. Excess sulfur is converted into hydrogen sulfide which is picked up by the recycle gas such that it contaminates the entering feed. This, because of the high sulfur sensitivity of these catalysts, results in more rapid catalyst deactivation and loss of $C_5+$ liquid yields. Moreover, during regeneration, some of the sulfur is oxidized to sulfur dioxide and sulfur trioxide which forms corrosive acids with water introduced into the process and contributes to sulfation of the inorganic oxide or alumina base, resulting in loss of surface area and activity.

Another problem is that the new, fresh, or regenerated multimetallic catalysts, especially iridium-containing catalysts, and notably platinum-iridium catalysts, become rapidly overheated when exposed, in the presence of hydrogen, at normal reaction conditions to hydrocarbons, which can crack to produce methane, ethane, propane and butane, to such extent that the catalyst itself can be overheated, sintered or otherwise damaged.

In U.S. Pat. No. 3,884,799 to Mahoney et al, which issued May 20, 1975, there is disclosed a catalyst, and process for using such catalyst for reforming a petroleum hydrocarbon fraction at conventional reforming conditions, which is constituted of a Group VIII noble metal, notably platinum, and rhenium and selenium composited on a refractory inorganic oxide, notably alumina, to which is added a halogen component, notably a chloride. This reference discusses the problem of hydrogenolysis which occurs in reforming during start-up with an unsulfided, or improperly sulfided, halogenated platinum-rhenium catalyst, and it discloses and claims the process of using a catalyst in reforming in which selenium is incorporated therein thereby reducing coke formation and eliminating any necessity of a pre-sulfiding treatment of that particular catalyst to suppress hydrogenolysis during start-up. Moverover, it is suggested that an substantial amount of the selenium is retained on the catalyst during reforming, and subsequently after the catalyst has been subjected to an appreciable number of simulated regeneration cycles. This provides advantages in that the catalyst need not be retreated after each regeneration, and presulfiding of the catalyst becomes unnecessary. U.S. Pat. No. 2,851,399 to Brennan et al also discloses a reforming catalyst containing platinum and selenium composited with alumina useful in reforming but, inter alia, there is no suggestion of a third hydrogenation-dehydrogenation component.

It is accordingly a primary objective of the present invention to obviate these and other prior art deficiencies and, in particular, to provide the art with a new and improved startup process for upgrading naphthas by reforming with iridium or rhenium containing catalysts to produce higher octane gasolines.

A further object is to provide a new and improved cyclic reforming process for effecting, at suitable reforming conditions, the production of high octane gasolines while minimizing hydrogenolysis, particularly runaway hydrocracking, especially when employing iridium-, or rhenium-containing catalysts, notably platinum-iridium catalysts.

These and other objects are achieved in accordance with the present invention embodying a process comprising incorporating sulfurous acid, $H_2SO_3$, or sulfuric acid, $H_2SO_4$, or both, within an iridium-, or rhenium-containing reforming catalyst, notably a platinum-iridium catalyst, at the time of its preparation by contact with a liquid solution, preferably an aqueous solution, containing one or both of these compounds.

In another of its aspects the present invention embodies a reforming catalyst or catalyst composite comprising a refractory or inorganic oxide support material, particularly alumina, a Group VIII noble metal hydrogenation-dehydrogenation component, notably platinum, to which iridium, or rhenium, or both, and sulfurous acid or sulfuric acid, or both, have been added, by contact with a liquid solution of one or both of these compounds to promote the activity and selectivity of the catalysts, and said catalyst has been prepared by a method wherein the sulfurous acid or sulfuric acid is introduced into and deposited throughout said support. Suitably, the reforming catalyst, or composite also contains a halogen component, particularly chlorine, and preferably the sulfurous acid or sulfuric acid component is introduced into the support, or catalyst, by impregnating same with a sulfurous acid or sulfuric acid solution.

The incorporation of sulfurous acid or sulfuric acid into the catalyst at the time of its formation, though the reasons therefor are not as yet completely understood, obviates any need for in situ sulfiding of the catalyst with $H_2S$ as in conventional practice. The sulfurous acid or sulfuric acid component remains within the catalyst throughout the operation suppressing hydrogenolysis, and yet does not create the problems associated with conventional catalyst sulfiding. The presence of sulfurous acid or sulfuric acid within the catalyst not only suppresses hydrogenolysis but additionally enhances the reforming characteristics of the catalyst.

In accordance with this invention, a porous refractory inorganic oxide support is employed as a suitable impregnation material. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g.$, preferably from about 100 to about 300 $m^2/g.$, a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metallic component of the Group VIII noble metals of the Periodic Table of the Elements (Sargent-Welch Scientific Company, Copyright 1968) necessarily includes iridium or rhenium, or both, and one or more platinum group metal components such as ruthenium, rhodium, palladium, osmium, platinum, and the like. Of these latter class of metals, platinum is the preferred component, and platinum-iridium catalyst, the preferred species of catalysts, can be further promoted to increase the normally expected activity and selectivity of these catalysts.

The additional metallic component, or components, is suitably a component selected from the Group IV (Ge, Sn, Pb) metals, Group VI (Cr. Mo, W) metals, Group VII metals, and Group VIII metals. For example, germanium, tin, lead, osmium, ruthenium, or rhodium can be used. Although one or more of these components can be added by any of the conventional methods, it is preferably to add them by an impregnation prior to, following or simultaneously with the impregnation of the Group VIII noble metal, iridium or rhenium (or both), sulfurous acid or solfuric acid, or halogen components. The sulfurous acid or sulfuric acid component, and promoter metal components are added in concentration ranging about 0.01 to 3 percent, preferably from about 0.02 to about 1 percent, based on the weight of the catalyst.

The metal hydrogenation components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or ammonium carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or non-agglomerating atmosphere. The metal hydrogenation components can also be added to the catalyst by impregnation, typically via an "incipient wetness" technique which requires a minimum of solution so that the total solution is absorbed, initially or after some evaporation.

It is generally preferred, however, to deposit the Group VIII noble metal, or metals, iridium and metals used as promoters, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

The Group VIII noble metal component (iridium or rhenium, other metals used as promoters, and the sulfurous acid or sulfuric acid component) is supported on the carrier within the range of from about 0.01 to 3 percent, preferably from about 0.02 to 1 percent, based on the weight of the catalyst. In compositing the Group VIII noble metal with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where the Group VIII noble metal is platinum, platinum chloride, platinum nitrate, chloroplatinic acid, ammonium chloroplatinate, potassium chloroplatinate, platinum polyamine, platinum acetylacetonate, and the like, are preferably used.

The impregnation solution of the noble metal compound, sulfurous acid or sulfuric acid, or both, and metals used as promoters, are prepared by dissolving the compounds in water or any other inorganic or organic solvent. The concentration of the metallic component ranges from about 0.01 to 5 percent, preferably from about 0.05 to 1 percent, based on the weight of solution. The pH of the impregnation solution should be controlled to less than about 4, preferably less than 3. By controlling the pH within these ranges, the components can be effectively dispersed into the inner part of the catalyst. Generally, it is preferred to use a halogen-acid aqueous solution of the noble metals.

In accordance with this invention, the sulfurous acid or sulfuric acid component is incorporated into the catalyst at the time of its formation and preferably sulfurous acid or sulfuric acid is incorporated by impregnation of the carrier with a solution which contains one or both of these acid compounds. This can be carried out simultaneously with, prior to, or following the impregnation of the hydrogenation-dehydrogenation component, or components, into the carrier. The sulfurous acid or sulfuric acid component, in accordance with this invention, can be added to the carrier from a solution which contains both one or both of these compounds, the Group VIII noble metal hydrogenation-dehydrogenation component, or components, and iridium or rhenium. Suitably, the salts or compounds are dissolved in a suitable solvent, preferably water, to form a solution, or each moiety is separately dissolved in a solution, the solutions admixed and the admixed solution used for impregnation of the carrier.

The concentration of the sulfurous acid or sulfuric acid component in the impregnation solution ranges from about 0.01 to 2 percent, preferably from about 0.01 to 1 weight percent, based on the weight of the solvent; this concentration being adequate to impregnate generally from about 0.001 to about 3 percent, preferably from about 0.01 to about 1 percent of the sulfurous acid or sulfuric acid within the catalyst.

The impregnation of the Group VIII noble metal, iridium or rhenium, and sulfurous acid or sulfuric acid components into a carrier is carried out by impregnating the carrier with the solution of the acid, or acids and the respective salts or compounds of the metals to be incorporated. The amount of impregnation solution used should be sufficient to completely immerse the carrier, usually within the range from about 1 to 20 times of the carrier by volume, depending on the concentration of the impregnating compounds in the impregnation solution. The impregnation treatment can be carried out under a wide range of conditions including ambient or elevated temperatures and atmospheric or supratmospheric pressures.

In a preferred embodiment of the present invention a carrier can be impregnated with an aqueous halogen-acid solution of the Group VIII noble metal, iridium or rhenium, and other compounds, if any, followed by evaporation or filtration and then drying or calcination, or both, and then the metals impregnated catalysts can be impregnated with a solution containing the sulfurous acid or sulfuric acid followed by evaporation or filtration and then drying or calcination, or both, whereby said component can be dispersed substantially uniformly to the inner part of the catalyst.

To enhance catalyst performance, it is also required to add a halogen component. Fluorine and chlorine are preferred halogen components. The halogen is contained on the catalyst within the range of 0.1 to 3 percent, preferably within the range of about 0.3 to 2 percent, based on the weight of the catalyst. When using chlorine as a halogen component, it is contained on the catalyst within the range of about 0.2 to 2 percent, preferably within the range of about 0.5 to 1.5 percent; based on the weight of the catalyst. The introduction of halogen into catalyst can be carried out by any method and at any time of the catalyst preparation, for example, prior to, following or simultaneously with the impregnation of the noble metal, iridium or rhenium, or sulfurous or sulfuric acid components. In the usual operation, the halogen component is introduced simultaneously with the incorporation of the noble metal component. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50-750 | 100-300 |
| Reactor Temp., °F. | 750-1100 | 850-1000 |
| Gas Rate, SCF/B (Incl. Recycle Gas) | 1500-10,000 | 2000-7000 |
| Feed Rate, W/W/Hr | 0.5-10 | 1-3 |

The invention will be more fully understood by reference to the following nonlimiting demonstrations and examples which present comparative data which illustrate its more salient features. All parts are given in terms of weight except as otherwise specified.

EXAMPLE 1

In order to demonstrate a preferred mode of practicing the present invention, certain selected salient data are set forth hereafter. In preparing for these demonstrations, a commercial platinum-iridium catalyst (Catalyst A) of the following weight percent composition was first prepared, and then dried at 300° F. and calcined at 500° F., to wit:

Catalyst A
  Platinum—0.3%
  Iridium—0.3%
  Chlorine—0.9%
  Alumina—98.5%

A second catalyst, Catalyst B, was prepared from Catalyst A by sulfiding with $H_2S$ in hydrogen stream at 900° F. to incorporate 0.067 wt.% S on the catalyst.

Catalyst B is thus of the following approximate composition, to wit:

Catalyst B
  Platinum—0.3%
  Iridium—0.3%
  Chlorine—0.9%
  Sulfur—0.067%
  Alumina—98.5%

Catalyst C was prepared from Catalyst A by impregnating with a dilute aqueous solution of $H_2SO_4$ to incorporate 0.03% S on the catalyst. The composition of Catalyst C is as follows:

Catalyst C
  Platinum—0.3%
  Iridium—0.3%
  Chlorine—0.9%
  Sulfur—0.03%
  Alumina—98.5%

Catalyst D was also prepared from Catalyst A in a similar manner as in the preparation of Catalyst C was the exception that 0.065% S was deposited via $H_2SO_4$ impregnation. The composition of Catalyst D is as follows:

Catalyst D
  Platinum—0.3%
  Iridium—0.3%
  Chlorine—0.9%
  Sulfur—0.065%
  Alumina—98.4%

The catalysts were each then contacted at reforming condition in separate runs with Karlsruhe Aramco naphtha, characterized in Table I as having the following inspections:

TABLE 1

| ASTM Distillation, °F. | |
|---|---|
| Initial | 151 |
| 10 | 191 |
| 20 | 208 |
| 30 | 224 |
| 40 | 239 |
| 50 | 255 |
| 60 | 270 |
| 70 | 289 |
| 80 | 310 |
| 90 | 334 |
| Final B.P. | 361 |
| Octane No., RON Clear | 40.0 |
| Gravity, °API | 60.0 |
| Sulfur, Wt. ppm | 0.8 |
| Analysis, Vol. Percent | |
| Paraffins | 67.4 |
| Naphthenes | 19.5 |
| Aromatics | 13.1 |

The conditions at which the reforming runs were carried out, and the results obtained are given in Table II.

TABLE II

Results of Reforming of Karlsruhe Aramco Naphtha @910° F. 200 Psig. 2.1 W/Hr/W and 5000 SCF $H_2$/B
Catalyst Age: 28 Hours

| Catalyst | Method of Incorporation and Substance Incorporated | Wt. % Incorporated Substance On Catalyst | ppm S in Feed | Wt. % on Feed | | | |
|---|---|---|---|---|---|---|---|
| | | | | $C_1$ | $C_1 + C_2 + C_3 + C_4$ | $C_5+$ | Arom. |
| A | None | 0.0 | <0.1 | 52.2 | 83.6* | 21.9* | 23.7 |
| A | None | 0.0 | 0.8 | 19.3 | 52.4* | 48.9 | 40.8 |
| B | $H_2S$ Treatment @900° F. | 0.067 | 0.8 | 4.1 | 24.8 | 73.6 | 50.1 |
| C | $H_2SO_4$ Impreg. | 0.03 | 0.8 | 3.8 | 22.3 | 76.0 | 51.6 |

TABLE II-continued

Results of Reforming of Karlsruhe Aramco
Naphtha @910° F. 200 Psig. 2.1 W/Hr/W and 5000 SCF $H_2$/B
Catalyst Age: 28 Hours

| Catalyst | Method of Incorporation and Substance Incorporated | Wt. % Incorporated Substance On Catalyst | ppm S in Feed | $C_1$ | $C_1 + C_2 + C_3 + C_4$ | $C_5+$ | Arom. |
|---|---|---|---|---|---|---|---|
| D | $H_2SO_4$ Impreg. | 0.065 | 0.8 | 3.9 | 22.3 | 75.5 | 51.0 |

*Negative hydrogen make

The first few hours of a reforming cycle are critical since at this stage excessive hydrogenolysis, or runaway hydrocracking can occur increasing the temperature of the bed which in turn can lead to more cracking; and this condition can result in reactor melt down. However, excessive hydrogenolysis did not occur in any of these runs which utilized Catalysts B, C, and D. Referring specifically to Table II, it is seen that Catalyst A results in excessive light gas make ($C_1$, $C_2$, $C_3$ and $C_4$) and causes a loss in the desired $C_5+$ yield. This situation is particularly pronounced with the low sulfur (<0.1 ppm) feed. Catalyst B prepared by the known $H_2S$ treatment lowers the initial cracking and enables catalyst to be handled in a safe manner.

The beneficial effects of $H_2SO_4$ treatment are shown by the results observed with Catalyst C and D. The amount of cracking is significantly less than the conventionally $H_2S$ treated Catalyst B, perhaps due in part to a more even sulfur distribution obtained by the $H_2SO_4$ acid impregnation. Moreover, in any event, the $C_5+$ yields are increased by 1.9 to 2.4 wt.%. This yield increase is accompanied by no loss and perhaps even a gain in aromatics content which according to known correlations results in higher octane.

The following example illustrates the advantages of incorporating sulfuric acid within a rhenium-containing catalyst.

EXAMPLE 2

To illustrate the performance of rhenium-containing catalysts containing small amounts of sulfuric acid, reforming tests were conducted with platinum-rhenium catalysts to which had been added a small amount of tellurium and selenium, respectively, and these were compared with commercially available platinum-rhenium catalysts, one of which was pretreated with hydrogen sulfide as commercially practiced and the other of which was not pretreated.

These catalysts, each of which is identified hereafter and designated as Catalysts E, F, G, H and I, was contacted at reforming conditions adequate to produce a 100 RON $C_5$ liquid product in separate runs with a commercially available low sulfur paraffinic naphtha, characterized in Table III as having the following inspections:

TABLE III

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No., RON Clear | 34.8 |
| Gravity, °API | 59.7 |
| Sulfur, Wt. ppm | <0.1 |
| Analysis, Vol. Percent | |
| Paraffins | 69.509 |
| Naphthenes | 18.411 |
| Aromatics | 12.08 |

The identity of each of the catalysts which contain, besides the added hydrogen sulfide, sulfuric acid, tellurium or selenium components, if any, in the amount designated also contain 0.3 wt. % platinum, 0.3 wt. % rhenium and 1 wt. % chlorine composited with alumina, dried and calcined as in the previous example. The results of runs conducted with these catalysts, at the designated conditions for an initial six hour balance period are as given in Table IV.

TABLE IV

REFORMING OF LOW SULFUR (<0.1 PPM) PARAFFINIC FEED
@930°, 200 PSIG 5000 SCF/B AND 1.4 W/H/W
Initial 6 Hour Balance Period

| | | Wt. % On Feed | | |
|---|---|---|---|---|
| Identify of Catalyst, and Treatment | $C_5+$Yield @100 RON, Volume % | $CH_4$ | $C_1 + C_2 + C_3 + C_4$ | Wt. Ratio Aromatics/ $C_1 + C_2 + C_3 + C_4$ |
| E Standard catalyst; not pretreated | 60.9 | 6.9 | 30.3 | 45.1 |
| F Presulfided with $H_2S$ (0.06% S) | 67.6 | 2.7 | 24.7 | 50.2 |
| G 0.05% S via $H_2SO_4$ | 65.9 | 4.1 | 24.8 | 47.9 |
| H 0.06% Te via $H_2Te$ via $H_2TeO_4$ impreg. | 67.7 | 5.9 | 32.3 | 52.1 |
| I 0.04% Se via $H_2SeO_3$ impreg. | 53.9 | 25.6 | 58.4 | 36.3 |

These data show a definite advantage for sulfuric acid as a promoter. The $C_5+$ liquid product is thus considerably higher than with an untreated catalyst, methane and gas production are suppressed, and aromatics yield is increased. The sulfuric acid treated catalyst appears as good as the conventional sulfiding treatment for suppression of gas production generally and, though it does not appear quite as effective as the hydrogen sulfide treated catalyst in the production of $C_5+$ liquid and aromatics yield it nontheless offers the advantage of greater permanency, and greatly simplifies the catalyst treatment procedures. The sulfuric acid treated catalyst is, of course, far more effective than the selenium promoted catalyst, which is ineffective, and is superior to the tellurium promoted catalyst in suppressing gas production.

It is apparent that various modifications and changes can be made without departing the spirit and scope of the present invention, outstanding features of which are that hydrogenolysis can be suppressed without the use of conventional catalyst presulfiding techniques, and the octane quality of hydrocarbon feedstocks can be upgraded and improved.

Having described the invention, what is claimed is:

1. A process for reforming a hydrocarbon feed at reforming conditions with a reforming catalyst which comprises a Group VIII noble metal hydrogenation-dehydrogenation component, a component comprised of iridium or rhenium, or both, a halogen component, and sufficient of a sulfurous acid or sulfuric acid component to increase the activity or selectivity, or both, as contrasted with a catalyst otherwise similar except that it does not contain sulfurous acid or sulfuric acid.

* * * * *